(12) United States Patent
Nallur et al.

(10) Patent No.: US 7,274,857 B2
(45) Date of Patent: Sep. 25, 2007

(54) TRICK MODES FOR COMPRESSED VIDEO STREAMS

(75) Inventors: Ramesh Nallur, Duluth, GA (US); Arturo A. Rodriguez, Norcross, GA (US); Jeffrey C. Hopper, Decatur, GA (US); Ajith N. Nair, Lawrenceville, GA (US); Peter Chan, Lawrenceville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 1363 days.

(21) Appl. No.: 10/038,943

(22) Filed: Dec. 31, 2001

(65) Prior Publication Data

US 2003/0123849 A1    Jul. 3, 2003

(51) Int. Cl.
*H04N 5/91* (2006.01)

(52) U.S. Cl. .................................. 386/68; 386/111
(58) Field of Classification Search ............... 386/68, 386/46, 86, 111
See application file for complete search history.

(56) References Cited

U.S. PATENT DOCUMENTS

| | | | |
|---|---|---|---|
| 5,377,051 A | 12/1994 | Lane et al. | 360/33.1 |
| 6,009,231 A * | 12/1999 | Aoki et al. | 386/68 |
| 6,847,778 B1 * | 1/2005 | Vallone et al. | 386/68 |
| 2002/0044762 A1 | 4/2002 | Wood et al. | 386/68 |

* cited by examiner

*Primary Examiner*—Thai Q. Tran
*Assistant Examiner*—Daniel Tekle

(57) ABSTRACT

A method for implementing trick mode functionality includes storing a video stream and information related to the video stream in memory, receiving a request for a trick mode operation, decoding a plurality of undecoded dependent frames to create a decoded frame, and outputting the decoded frame.

47 Claims, 6 Drawing Sheets

TRICK MODES FOR COMPRESSED VIDEO STREAMS

FIELD OF THE INVENTION

The present invention is generally related to trick modes, and more particularly related to trick modes for compressed video streams.

BACKGROUND OF THE INVENTION

Digital video compression methods work by exploiting data redundancy in a video sequence (i.e., a sequence of digitized pictures). There are two types of redundancies exploited in a video sequence, namely, spatial and temporal, as is the case in existing video coding standards. A description of these standards can be found in the following publications, which are hereby incorporated herein by reference: (1) ISO/IEC International Standard IS 11172-2, "Information technology—Coding of moving pictures and associated audio for digital storage media at up to about 1.5 Mbits/s—Part 2: video," 1993; (2) ITU-T Recommendation H-262 (1996): "Generic coding of moving pictures and associated audio information: Video," (ISO/IEC 13818-2); (3) ITU-T Recommendation H.261 (1993): "Video codec for audiovisual services at px64 kbits/s"; (4) Draft ITU-T Recommendation H.263 (1995): "Video codec for low bitrate communications."

Compressed video streams typically include independent and dependent frames. An independent frame is a frame that is coded using information only from itself whereas a dependent frame is a frame that is coded using information from one or more other frames. An example of an independent frame is an Intra frame (I-frame). I-frames are compressed by exploiting the internal spatial redundancy of each macroblock independently of reference pictures. The first picture of a picture sequence is typically, but not necessarily, an I-frame. Examples of dependent frames are Predictive frames (P-frames) and bi-directional frames (B-frames). P-frames are pictures in which macroblocks can be compressed by predicting their value from a past reference picture. A past reference picture is a picture, either an I or another P-frame that is to be displayed prior to the current picture. B-frames are pictures in which macroblocks can be compressed by predicting their value from a past reference picture and a future reference picture. A future reference picture is a picture, either an I or another P-frame that is to be displayed after to the current picture.

A compressed video stream may be used to provide trick modes such as, for example, fast-forward playback and reverse playback. Providing trick modes for a compressed video stream has traditionally required the presence of I-frames in the video stream. For example, U.S. Pat. No. 6,057,832 (Lev et al.) discloses one method whereby MPEG-2 stream containing I-frames may be used to provide trick mode functionality. However, some MPEG-2 streams such as for example, HITS (Headend In The Sky) streams, do not contain I-frames or a typical grouping of pictures and are therefore incapable of providing multiple playback modes using traditional methods. Therefore, there exists a need for systems and methods for providing trick mode functionality in connection with compressed video streams that do not include a certain type of frames.

BRIEF DESCRIPTION OF THE DRAWINGS

Embodiments of the invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments, examples and implementations set forth herein. Rather, these non-limiting embodiments, examples and implementations are provided so that this disclosure will include at least some of the large scope of the present invention.

Figure 1:
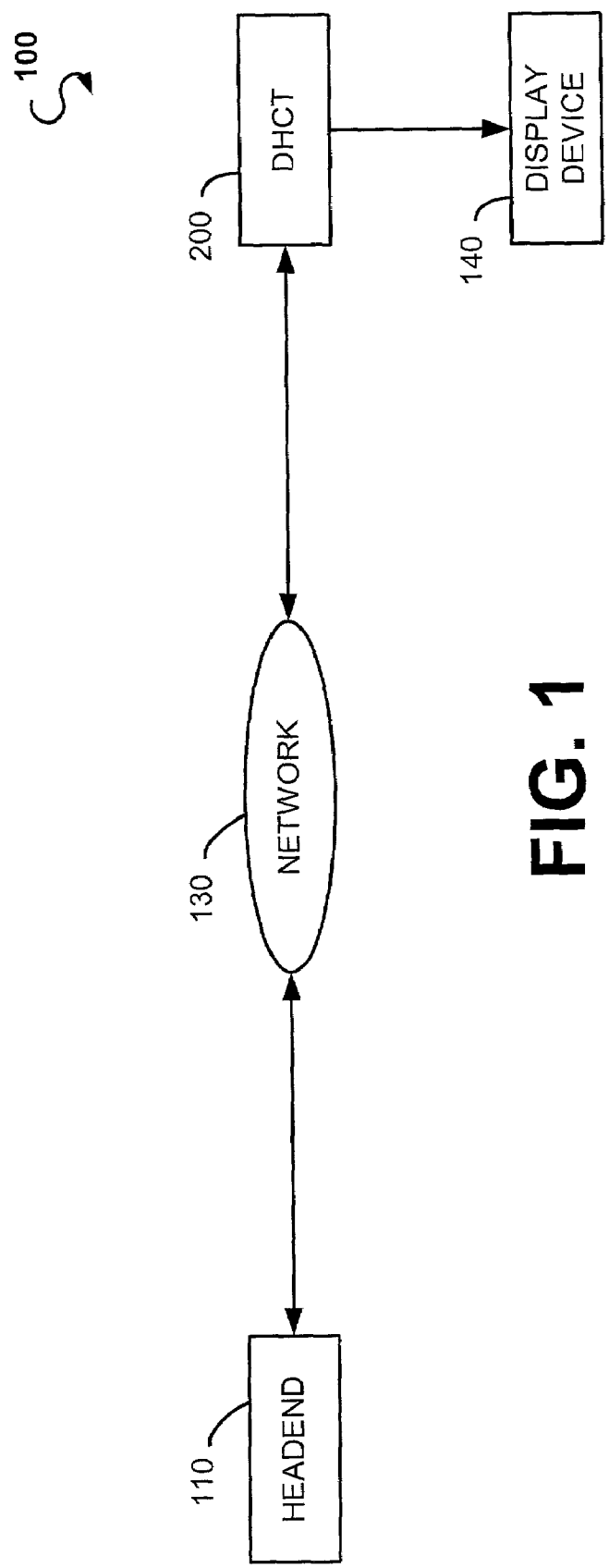
FIG. 1 is a high-level block diagram depicting a non-limiting example of a subscriber television system.

FIG. 1 is a block diagram depicting a non-limiting example of a subscriber television system (STS) 100. In this example, the STS 100 includes a headend 110 and a DHCT 200 that are coupled via a network 130. The DHCT 200 is typically situated at a user's residence or place of business and may be a stand-alone unit or integrated into another device such as, for example, the display device 140 or a personal computer (not shown). The DHCT 200 receives signals (video, audio and/or other data) including, for example, MPEG-2 streams, among others, from the headend 110 through the network 130 and provides any reverse information to the headend 110 through the network 130. The network 130 may be any suitable means for communicating television services data including, for example, a cable television network or a satellite television network, among others. The headend 110 may include one or more server devices (not shown) for providing video, audio, and textual data to client devices such as DHCT 200. The headend 110 and the DHCT 200 cooperate to provide a user with television functionality including, for example, television programs, an interactive program guide (IPG), and/or video-on-demand (VOD) presentations. The television services are provided via the display device 140 which is typically a television set. However, the display device 140 may also be any other device capable of displaying video images including, for example, a computer monitor.

Figure 2:
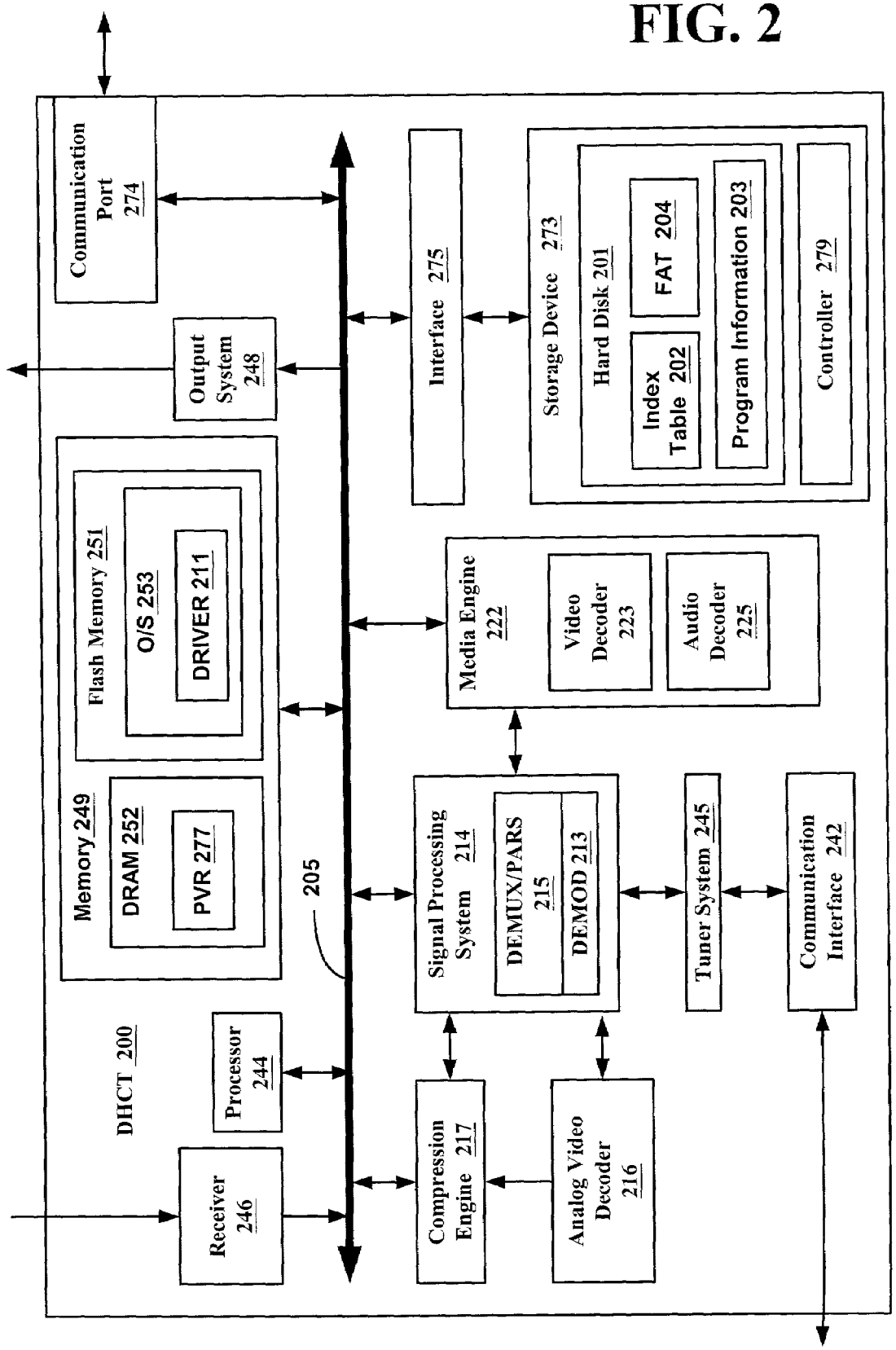
FIG. 2 is a block diagram of a DHCT in accordance with one embodiment of the present invention.

FIG. 2 is a block diagram illustrating selected components of a DHCT 200 in accordance with one embodiment of the present invention. It will be understood that the DHCT 200 shown in FIG. 2 is merely illustrative and should not be construed as implying any limitations upon the scope of the preferred embodiments of the invention. For example, in another embodiment, the DHCT 200 may have fewer, additional, and/or different components than illustrated in FIG. 2. A DHCT 200 is typically situated at a user's residence or place of business and may be a stand alone unit or integrated into another device such as, for example, a television set or a personal computer. The DHCT 200 preferably includes a communications interface 242 for receiving signals (video, audio and/or other data) from the headend 110 through the network 130 (FIG. 1) and for providing any reverse information to the headend 110.

The DHCT 200 further preferably includes at least one processor 244 for controlling operations of the DHCT 200, an output system 248 for driving the television display 140, and a tuner system 245 for tuning to a particular television channel or frequency and for sending and receiving various types of data to/from the headend 110. The DHCT 200 may, in another embodiment, include multiple tuners for receiving downloaded (or transmitted) data. Tuner system 245 can select from a plurality of transmission signals provided by the subscriber television system 100. Tuner system 245 enables the DHCT 200 to tune to downstream media and data transmissions, thereby allowing a user to receive digital or analog media content via the subscriber television system. The tuner system 245 includes, in one implementation, an out-of-band tuner for bi-directional quadrature phase shift keying (QPSK) data communication and a quadrature amplitude modulation (QAM) tuner (in band) for receiving television signals. Additionally, a receiver 246 receives externally-generated user inputs or commands from an input device such as, for example, a remote control.

The DHCT 200 may include one or more wireless or wired interfaces, also called communication ports 274, for receiving and/or transmitting data to other devices. For instance, the DHCT 200 may feature USB (Universal Serial Bus), Ethernet, IEEE-1394, serial, and/or parallel ports, etc. DHCT 200 may also include an analog video input port for receiving analog video signals. User input may be provided via an input device such as, for example, a hand-held remote control device or a keyboard.

The DHCT 200 includes signal processing system 214, which comprises a demodulating system 213 and a transport demultiplexing and parsing system 215 (herein demultiplexing system) for processing broadcast media content and/or data. One or more of the components of the signal processing system 214 can be implemented with software, a combination of software and hardware, or preferably in hardware. Demodulating system 213 comprises functionality for demodulating analog or digital transmission signals. For instance, demodulating system 213 can demodulate a digital transmission signal in a carrier frequency that was modulated, among others, as a QAM-modulated signal. When tuned to a carrier frequency corresponding to an analog TV signal, demultiplexing system 215 is bypassed and the demodulated analog TV signal that is output by demodulating system 213 is instead routed to analog video decoder 216. Analog video decoder 216 converts the analog TV signal into a sequence of digitized pictures and their respective digitized audio. Digitized pictures and respective audio output by analog video decoder 216 are presented at the input of compression engine 217.

Compression engine 217 processes the sequence of digitized pictures and digitized audio and converts them into compressed video and audio streams, respectively. The compressed video and audio streams are produced in accordance with the syntax and semantics of a designated audio and video coding method, such as, for example, MPEG-2, so that they can be interpreted by video decoder 223 and audio decoder 225 for decompression and reconstruction at a future time. Each compressed stream consists of a sequence of data packets containing a header and a payload. Each header contains a unique packet identification code, or PID, associated with the respective compressed stream.

Compression engine 217 multiplexes the audio and video compressed streams into a transport stream, such as an MPEG-2 transport stream. Furthermore, compression engine 217 can preferably compress audio and video corresponding to more than one program in parallel (e.g., two tuned analog TV signals when DHCT 200 has multiple tuners) and to multiplex the respective audio and video compressed streams into a single transport stream. Output of compressed streams and/or transport streams produced by compression engine 217 is input to signal processing system 214. Parsing capabilities 215 within signal processing 214 allow for interpretation of sequence and picture headers, and in a preferred embodiment, annotating their locations within their respective compressed stream as well as other useful information for future retrieval from storage device 273, as described below. A compressed analog video stream (e.g., corresponding to a TV program episode or show) that is received via a tuned analog transmission channel can be output as a transport stream by signal processing 214 and presented as input for storage in storage device 273 via interface 275. The packetized compressed streams can be also output by signal processing 214 and presented as input to media engine 222 for decompression by video decoder 223 and audio decoder 225 for subsequent output to the display device 140 (FIG. 1).

Demultiplexing system 215 can include MPEG-2 transport demultiplexing. When tuned to carrier frequencies carrying a digital transmission signal, demultiplexing system 215 enables the separation of packets of data, corresponding to the desired video streams, for further processing. Concurrently, demultiplexing system 215 precludes further processing of packets in the multiplexed transport stream that are irrelevant or not desired such as, for example, packets of data corresponding to other video streams.

The components of signal processing system 214 are preferably capable of QAM demodulation, forward error correction, demultiplexing MPEG-2 transport streams, and parsing packetized elementary streams and elementary streams. The signal processing system 214 further communicates with processor 244 via interrupt and messaging capabilities of DHCT 200. The processor 244 annotates the location of pictures within the compressed stream as well as other pertinent information. The annotations by the processor 244 enable normal playback or other playback modes of the stored compressed stream of the respective compressed stream.

A compressed video stream corresponding to a tuned carrier frequency carrying a digital transmission signal can be output as a transport stream by signal processing 214 and presented as input for storage in storage device 273 via interface 275. The packetized compressed streams can be also output by signal processing system 214 and presented as input to media engine 222 for decompression by the video decoder 223 and audio decoder 225.

One having ordinary skill in the art will appreciate that signal processing system 214 may include other components not shown, including memory, decryptors, samplers, digitizers (e.g. analog-to-digital converters), and multiplexers, among others. Further, other embodiments will be understood, by those having ordinary skill in the art, to be within the scope of the preferred embodiments of the present invention. For example, analog signals (e.g., NTSC) may bypass one or more elements of the signal processing system 214 and may be forwarded directly to the output system 248. Outputs presented at corresponding next-stage inputs for the aforementioned signal processing flow may be connected via accessible DRAM 252 in which an outputting device stores the output data and from which an inputting device retrieves it. Outputting and inputting devices may include analog video decoder 216, compression engine 217, media engine 222, signal processing system 214, and components or sub-components thereof. It will be understood by those having ordinary skill in the art that components of signal processing system 214 can be spatially located in different areas of the DHCT 200.

Parser 215 parses (i.e., reads and interprets) compressed streams to interpret sequence headers and picture headers, and deposits a transport stream carrying compressed streams into DRAM 252. Processor 244 causes the transport stream to be transferred from DRAM 252 to the storage device 273 via interface 275. Upon demultiplexing and parsing the transport stream carrying one or more video streams, processor 244 interprets the data output by signal processing system 214 and generates ancillary data in the form of a table or data structure comprising the relative or absolute location of the beginning of certain pictures in the compressed video stream. Such ancillary data is used to facilitate the retrieval of desired video data during future operations.

In one embodiment of the invention, a plurality of tuners and respective demodulating systems 213, demultiplexing systems 215, and signal processing systems 214 may simultaneously receive and process a plurality of respective broadcast digital video streams. Alternatively, a single demodulating system 213, a single demultiplexing system 215, and a single signal processing system 214, each with sufficient processing capabilities may be used to process a plurality of digital video streams.

In yet another embodiment, a first tuner in tuning system 245 receives an analog video signal corresponding to a first video stream and a second tuner simultaneously receives a digital compressed stream corresponding to a second video stream. The first video stream is converted into a digital format. The second video stream and/or a compressed digital version of the first video stream are routed to the hard disk 201 of storage device 273. Data annotations for each of the two streams are performed to facilitate future retrieval of the video streams from the storage device 273. The first video stream and/or the second video stream may also be routed to media engine 222 for decoding and subsequent presentation via display device 140 (FIG. 1). The first video stream may be routed to media engine 222 in either a digital or analog format.

In one implementation, compression engine 217 can output formatted MPEG-2 or MPEG-1 packetized elementary streams (PES) inside a transport stream, all compliant to the syntax and semantics of the ISO MPEG-2 standard. Alternatively, compression engine 217 can output other digital formats that are compliant to other standards. The digital compressed streams output by compression engine 217 corresponding to a first video stream are routed to demultiplexing system 215. Demultiplexing system 215 parses (i.e., reads and interprets) the transport stream generated by compression engine 217 without disturbing its content and deposits the transport stream into DRAM 252. Processor 244 causes transport stream in DRAM 252 to be transferred to the storage device 273. In a preferred embodiment, while parsing the transport stream, demultiplexing system 215 outputs to DRAM 252 ancillary data in the form of a table or data structure comprising the relative or absolute location of the beginning of certain pictures in the compressed media content stream for the first video stream for facilitating retrieval during future operations. In this way, random access operations such as fast forward, rewind, and jumping to a location in the compressed video stream can be attained. Additional pertinent data is also written in the tables, as described below A plurality of compression engines 217 maybe used to simultaneously compress a plurality of analog video streams. Alternatively, a single compression engine 217 with sufficient processing capabilities may be used to compress a plurality of analog video streams. Compressed digital versions of respective analog video streams may be routed to the hard disk 201 of storage device 273. Data annotations for each of the video streams may be performed to facilitate future retrieval of the video streams from the storage device 273. Depending on requirements in effect at an instance of time, only a subset of the total number of compressed digital video signals may be routed to the storage device 273. Any of the received video streams can also be routed simultaneously to media engine 222 for decoding and subsequent presentation via display device 140.

The DHCT 200 includes at least one storage device 273 for storing video streams received by the DHCT 200. A PVR application 277, in cooperation with the operating system 253 and the device driver 211, effects, among other functions, read and/or write operations to the storage device 273. Herein, references to write and/or read operations to the storage device 273 will be understood to mean operations to the medium or media of the storage device 273 unless indicated otherwise. The device driver 211 is a software module preferably resident in the operating system 253. The device driver 211, under management of the operating system 253, communicates with the storage device controller 279 to provide the operating instructions for the storage device 273. As conventional device drivers and device controllers are well known to those of ordinary skill in the art, further discussion of the detailed working of each will not be described further here. Storage device 273 is preferably internal to DHCT 200, coupled to a common bus 205 through a communication interface 275. The communication interface 275 is preferably an integrated drive electronics (IDE) or small computer system interface (SCSI), although another interface such as, for example, IEEE-1394 or USB, among others, may be used. Alternatively, the storage device 273 can be externally connected to the DHCT 200 via a communication port 274. The communication port 274 may be, for example, an IEEE-1394, a USB, a SCSI, or an IDE. In one implementation, video streams are received in DHCT 200 via communications interface 242 and stored in a temporary memory cache. The temporary memory cache may be a designated section of DRAM 252 or an independent memory attached directly to communication interface 242. The temporary cache is implemented and managed to enable media content transfers to storage device 273. In one implementation, the fast access time and high data transfer rate characteristics of the storage device 273 enable media content to be read from the temporary cache and written to storage device 273 in a sufficiently fast manner. Multiple simultaneous data transfer operations may be implemented so that while data is being transferred from the temporary cache to storage device 273, additional data may be received and stored in the temporary cache.

In addition to specifying a video stream and/or its associated compressed streams, a request for retrieval and playback of a compressed video presentation stored in storage device 273 specifies information that includes the playback mode, direction of playback, entry point of playback with respect to the beginning of the compressed video presentation, and playback speed, if applicable. In addition, a request for retrieval and playback may also specify the duration of playback. As a non-limiting example, the playback mode specified in a request may be normal-playback, fast-reverse-playback, fast-forward-playback, slow-reverse-playback, slow-forward-playback, and pause-display. Playback speed is applicable to playback modes other than normal playback and pause display and may be specified as a factor or proportion of the normal playback speed. As a non-limiting example, playback speed specification may be 2X, 2X, 6X, 10x or 15X for fast-forward or fast-reverse playback, where X means "times normal play speed." Likewise, ⅛X, ¼X and ½X are non-limiting examples for the speed specification in request for slow-forward or slow-reverse playback. Direction of playback may be explicit in the playback mode or specified separately as forward or reverse in the specified request according to a predetermined format for a request's specification.

The entry point for playback is relative to the beginning of the compressed video presentation stored in storage device 273 and may be specified in a number of different ways according to the predetermined format for a request's specification. As a non-limiting example, the entry point in the request for which to start playback may be specified in relation to the beginning of the video presentation as elapsed normal playback time, number of pictures, or number of certain types of pictures.

In response to a request for retrieval and playback of a compressed stream for which the playback mode is "normal playback" or "pause-display" and for which the entry point is at the beginning of the compressed video stream, processor 244 in communication generally with device driver 211 and storage device controller 279 and demultiplexing system 215 effects retrieval of compressed video data, compressed audio data, and data streams from storage device 273 that correspond to one or more video streams specified in request. Retrieved streams are deposited in an output cache in storage device 273, transferred to DRAM 252, and then processed for playback according to mechanisms that would be understood by those having ordinary skill in the art. In some embodiments, the video streams are retrieved and routed from the hard disk 201 to the digital video decoder 223 and digital audio decoder 225 simultaneously, and then further processed for subsequent presentation via the display device 140.

In response to a request for retrieval and playback of a compressed stream stored in storage device 273 for which the playback mode is not "normal playback" or "pause-display," or for which the entry point is not at the beginning of the compressed video stream, processor 244 in communication generally with device driver 211 and storage device controller 279 reads information in the respective entry in the index table 202 for the requested compressed video stream to retrieve annotation data from storage device 273 that correspond to the requested video streams specified in request. Immediately thereafter under program control, processor 244 retrieves the program information file 203 from storage device 273 and interprets the program information file to compute the entry point location for which to fulfill the specified playback mode in the request. In a preferred embodiment of the invention, information pertaining the characteristics of compressed video stream is contained in program information file 203 and interpreted to fulfill the specified playback mode in the request. The requested playback mode is implemented by the processor 244 based on the characteristics of the compressed data, the playback mode specified in the request, and the processing and computing capabilities of DHCT 200. Retrieved streams are deposited in an output cache in storage device 273, transferred to DRAM 252, and then processed for playback by processor 244 under program control and in communication with video decoder 223. As a non-limiting example, video streams may retrieved and routed from the hard disk 201 to the digital video decoder 223 and digital audio decoder 225 simultaneously, and then further processed for eventual presentation on a display device 140.

Storage device 273 is preferably a hard disk drive but may in an alternative embodiment be any type of magnetic, optical, or semiconductor based storage device. The storage device 273 preferably includes at least one hard disk 201 and a controller 279. The controller 279 receives operating instructions from the device driver 211 and implements those instructions to cause read and/or write operations to the hard disk 201. The operating system 253, in cooperation with the device driver 211, communicates with the storage device controller 279 to format the hard disk 201.

In one embodiment of the invention, the operating system 253, device driver 211, and controller 279 cooperate to create a file allocation table (FAT). The FAT 204 is where the operating system 253 stores the information about the hard disk clusters and the files associated with those clusters. The operating system 253 can determine where a file's data is located by using the directory entry for the file and file allocation table (FAT) 204 entries. The directory entry gives information about a directory such as its related files and subdirectories. A FAT entry describes the physical locations of data for a video stream file (i.e. the file that the video stream is written to on the hard disk 201). Similarly, the FAT 204 also keeps track of which clusters are free, or open, and thus available for use. When an application such as PVR application 277 creates (or extends) a video stream file, the operating system 253, in cooperation with the device driver 211, queries the FAT 204 for an available cluster to begin writing the video stream. As a non-limiting example, to buffer a downloaded video stream into the storage device 273, the PVR application 277 creates a video stream file and video stream file name for the video stream to be downloaded. The operating system 253, in cooperation with the device driver 211, checks the FAT 204 for an available, or writable, cluster to write the video stream to. The PVR application 277 effects the device driver 211, through communication with the operating system 253, to cause the controller 279 to write the downloaded video stream to the available cluster under a particular video stream file name. The FAT 204 is then updated with the new video stream file name corresponding to the available cluster. If the video stream requires more data space than what the cluster can offer, the operating system 253 queries the FAT 204 for the location of another available cluster to continue writing the video stream to hard disk space. Upon finding another cluster, the FAT 204 is updated to keep track of which clusters are linked to store a particular video stream under the given video stream file name.

A multiplicity of clusters may be required to write a file corresponding to a compressed video stream to hard disk 201. The clusters corresponding to one particular video stream file may or may not be adjacent or contiguous clusters. The clusters corresponding to a particular video stream file can be fragmented throughout the hard disk space. As described earlier, a file allocation table (FAT) keeps track of which clusters are employed to write a downloaded video stream to the hard disk 201. Further, systems well known to those of ordinary skill in the art, such as defragmentators, can be employed to cause the clusters associated with a particular video stream file to be contiguous.

Input video streams may be received by the DHCT 200 from different sources. For example, an input video stream may be any of the following, among others:

1—Broadcast analog video signals that are received from a headend 110 via network 130 (FIG. 1) and network communication interface 242.
2—Analog video signals that are received from a consumer electronics device (e.g., an analog video camcorder) via analog audio and video connectors (not shown) such as, for example, S-Video input or composite video input.
3—An on-demand digital video stream that is received via network 130 (FIG. 1) and network communication interface 242.
4—A digital video stream that is received from a digital consumer electronic device (such as a personal computer or a digital video camcorder) via a digital video interface or a home network interface such as USB, IEEE-1394 or Ethernet.
5—A digital video stream that is received from an externally connected storage device (e.g., a DVD player) via a digital video interface or a communication interface such as IDE, SCSI, USB, IEEE-1394 or Ethernet.

The PVR application 277 provides a user interface that assists the user in navigating to, and between screens for selection and retrieval of previously stored compressed video data. The user interface may provide visual status and progress feedback to the user. For instance, during a slow-reverse playback mode, the user interface may display an icon associated with reverse playback along with the speed in effect, and the location of the currently displayed picture in relation to the beginning, end or both of the video presentation. The PVR application 277 may also be used to initiate a trick mode operation for a video stream that is stored in storage device 273. The PVR application 277 may be implemented in hardware, software, firmware, or a combination thereof. In a preferred embodiment, the PVR application 277 is implemented in software or firmware that is stored in a DRAM 52 and that is executed by processor 244. The PVR application 277, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Figure 3:
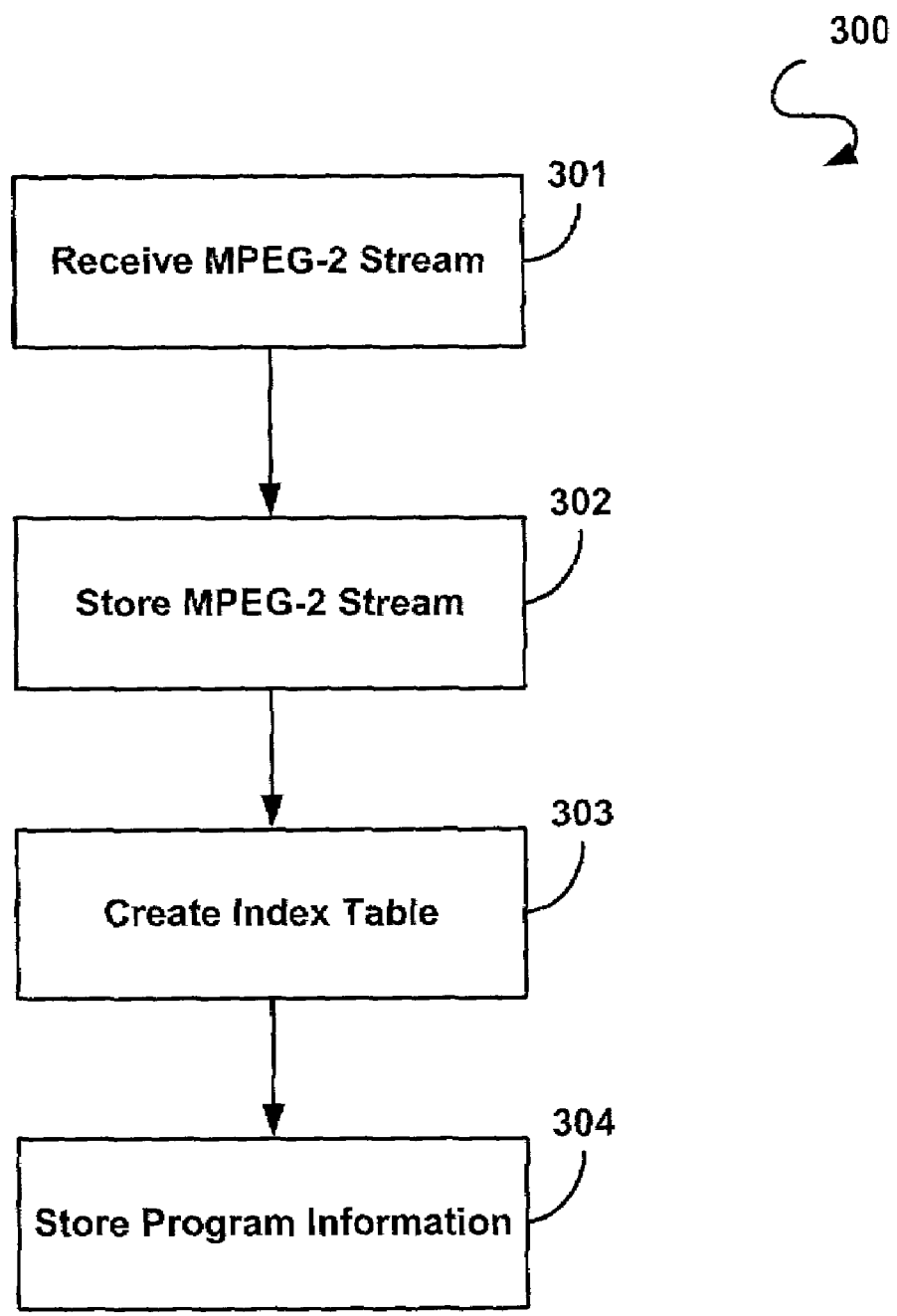
FIG. 3 is a flow chart depicting a non-limiting example of a method for providing trick mode functionality that is implemented by the DHCT depicted in FIG. 2.

FIG. 3 depicts a non-limiting example of a method 300 in accordance with one embodiment of the present invention. In step 301, the DHCT 200 receives an MPEG-2 stream from the headend 110 (FIG. 1) and then, in step 302, stores it in hard disk 201. The MPEG-2 stream is made up of multiple picture sequences wherein each picture sequence has a header. The beginning of each picture and picture sequence is determined by a start code. As the MPEG-2 stream is being stored in hard disk 201, the processor 244 creates a corresponding index table 202 as indicated in step 303. The index table 202 consists of elements that point to data in the hard disk 201 that define picture and sequence boundaries in the MPEG-2 stream. The index table 202 facilitates the delivery of selected data to the media engine 222. The index table 202 may include the following information about the MPEG-2 stream:

a) The storage location of each of the sequence headers.
b) The storage location of each picture start code.
c) The type of each picture (I, P, or B).
d) The real time of when each picture was stored.

In addition to creating an index table 202, the processor 244 in step 304 stores program information related to the MPEG-2 stream in a program information file 203. The program information file 203 includes the packet identification codes (PIDs) contained in the MPEG-2 stream as well as a flag that represents whether the stream contains I-frames. A determination as to whether the MPEG-2 stream contains I-frames may be made by inspecting a predetermined number of picture sequences; if no I-frame is found within the predetermined number of picture sequences, then the flag is set to false. It should be noted that the steps 301-304, or a subset thereof, may be performed substantially concurrently or in a different order than shown in FIG. 3. For example, the processor 244 may store data in the index table 202 and the program information file 203 as the MPEG-2 stream is being stored in hard disk 201.

Figure 4:
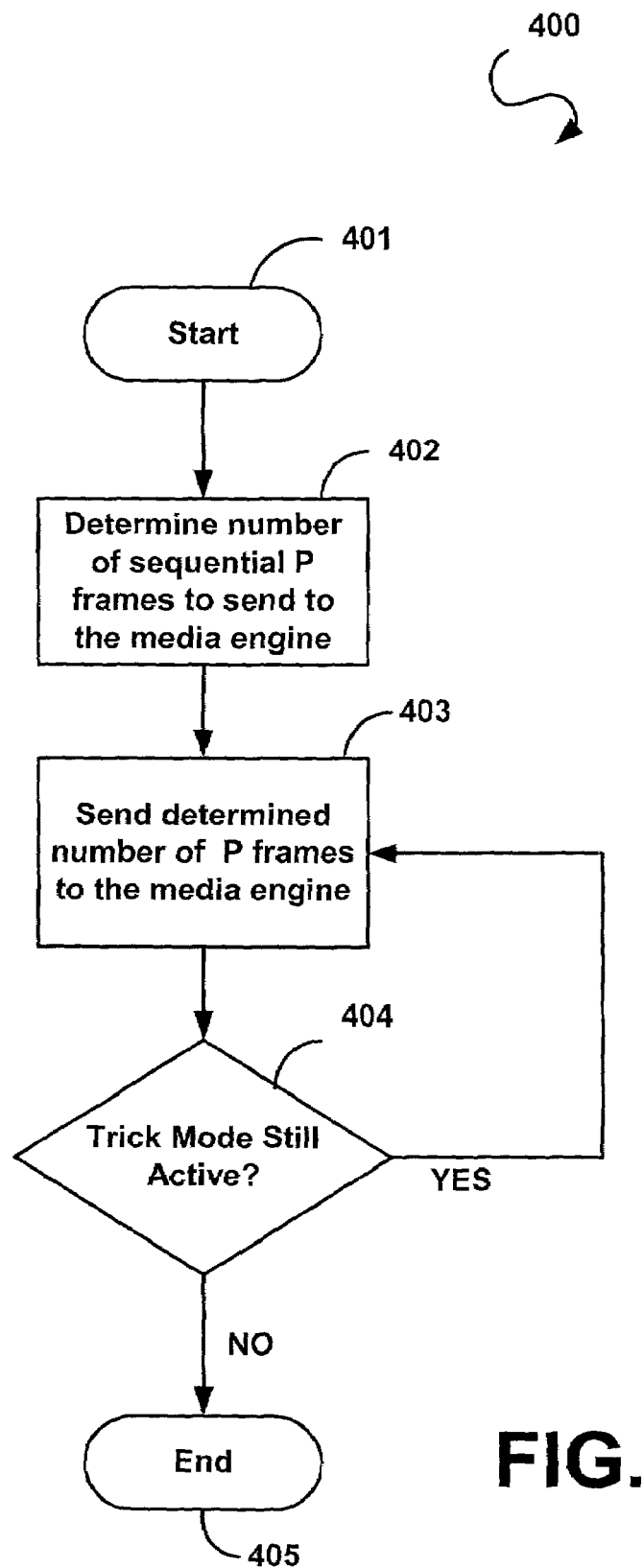
FIG. 4 is a flow chart depicting a non-limiting example of a method for providing trick mode functionality that is implemented by the DHCT depicted in FIG. 2.

FIG. 4 is a flow chart depicting a non-limiting example of a method 400 in accordance with one embodiment of the present invention. The method 400 is initiated in step 401 when the DHCT 200 receives user input requesting trick mode functionality. The user input may be provided via, for example, a remote control device. After the method 400 is initiated, the processor 244 determines the number of sequential P-frames to be sent to media engine 222, as indicated in step 402. The number of sequential P-frames to be sent to media engine 222 is determined by the characteristics of the corresponding MPEG-2 stream. As a non-limiting example, the number of sequential P-frames to be sent to media engine 222 may be 10. After the number of sequential P-frames is determined, the processor 244 retrieves in step 403 the determined number of sequential P-frames and sends them to media engine 222. The P-frames are retrieved by selecting an element at the current program position from the index table that contains the sequence header information. From the sequence header element, the sequence header location in memory is obtained. From this location in memory, the determined number of sequential P-frames are retrieved and sent to media engine 222. The index table is used to count the number of P-pictures. The processor 244 then determines in step 404 whether the requested trick mode is still active. If the trick mode is no longer active, then the method 400 terminates in step 405. However, if the trick mode is still active, then processor 244 repeats step 403.

The number of picture sets that are sent to media engine 222 within a given time period is equal to the desired trick mode speed multiplied by the number of picture sets that would need to be decoded in such a time period to achieve a normal play mode. For example, if two picture sets need to be decoded per second to achieve a normal play mode, then to achieve a trick mode speed that is twice as fast as a normal play mode speed, 4 picture sets corresponding to a 2 second normal play period need to be selected and sent to media engine 222 per second. Media engine 222 will then decode and display four picture sets per second to achieve the correct speed. To select the 4 picture sets corresponding to a 2 second normal play period, the time stamp on the picture element is used. In a similar manner as described above 4×, 6× or n×speed can be achieved. For rewind mode, the procedure is similar except that the picture sets are selected in the reverse direction.

In one possible embodiment of the invention, the picture sets that are sent to the media engine 222 may overlap. For example, if we assume that each picture set (PS) includes 5 P-frames, that 10 P-frames are decoded for each P-frame that is displayed, then the processor 244, in response to a request for a fast play mode, may send PS1 and PS2 to the media engine 222, followed by PS2 and PS3, followed by PS3 and PS4, etc (where the numerals refer to the relative sequence of the picture sets in a normal play mode). In this manner, the media engine 222 will output a decoded P-frame from PS2 after decoding PS1 and PS2 and then a decoded P-frame from PS3 after decoding PS2 and PS3, etc. In this example, the total number of picture sets that are sent to media engine 222 within a given time period is equal to the desired trick mode speed multiplied by twice the number of picture sets that would need to be decoded in such a time period to achieve a normal play mode.

In another embodiment, the picture sets that are sent to the media engine 222 may not all be contiguous. As a non-limiting example, assuming the following hypothetical circumstances: a user requests a fast play speed that is equal to six times (6×) the normal play speed, the media engine 222 is only capable of decoding 30 frames per second, the media engine 222 only decodes P-frames during fast play mode, the corresponding MPEG-2 stream includes 2 B-frames for every P-frame (e.g., B, B, P, B, B, P, B, B, P, etc), and each picture set is defined as including 5 P-frames among 15 total frames, then the processor 244 may send 2 picture sets to the media engine 222 and then skip 2 picture sets before sending another 2 picture sets. The processor 244 may, for example, send the following picture sets to the media engine 222 at the rate of 6 picture sets per second: PS3, PS4, PS7, PS8, PS11, PS12, PS15, PS16, etc. Alternatively, the processor 244 may send 3 picture sets to the media engine 222 and then skip 3 picture sets before sending another 3 picture sets. For example, the processor 244 may send the following picture sets to the media engine 222 at the rate of 6 picture sets per second: PS4, PS5, PS6, PS10, PS11, PS12, PS16, PS17, PS18, etc.

When picture sets are created and sent to the decoder the corresponding data may become discontinuous. This discontinuity can confuse the media engine 222 resulting in erroneous decoding and undesirable artifacts on the screen. To avoid this problem, stuffing transport packets may be inserted where a picture set ends and a new picture set starts. The stuffing transport packets consist of payload data that are 0xff bytes. There may also be a need to inform the decoder of the beginning and end of a picture set because the picture decoding is not synchronous with the data being sent to the decoder. There can be many buffers between the source and destination causing the process to be very asynchronous in nature. The discontinuity in the stream is communicated to the decoder by inserting transport packets that have an elementary stream payload consisting of "MPEG-2 user data". A specific byte pattern is sent in the user data to communicate the end of a picture set and the beginning of a new one.

Figure 5:
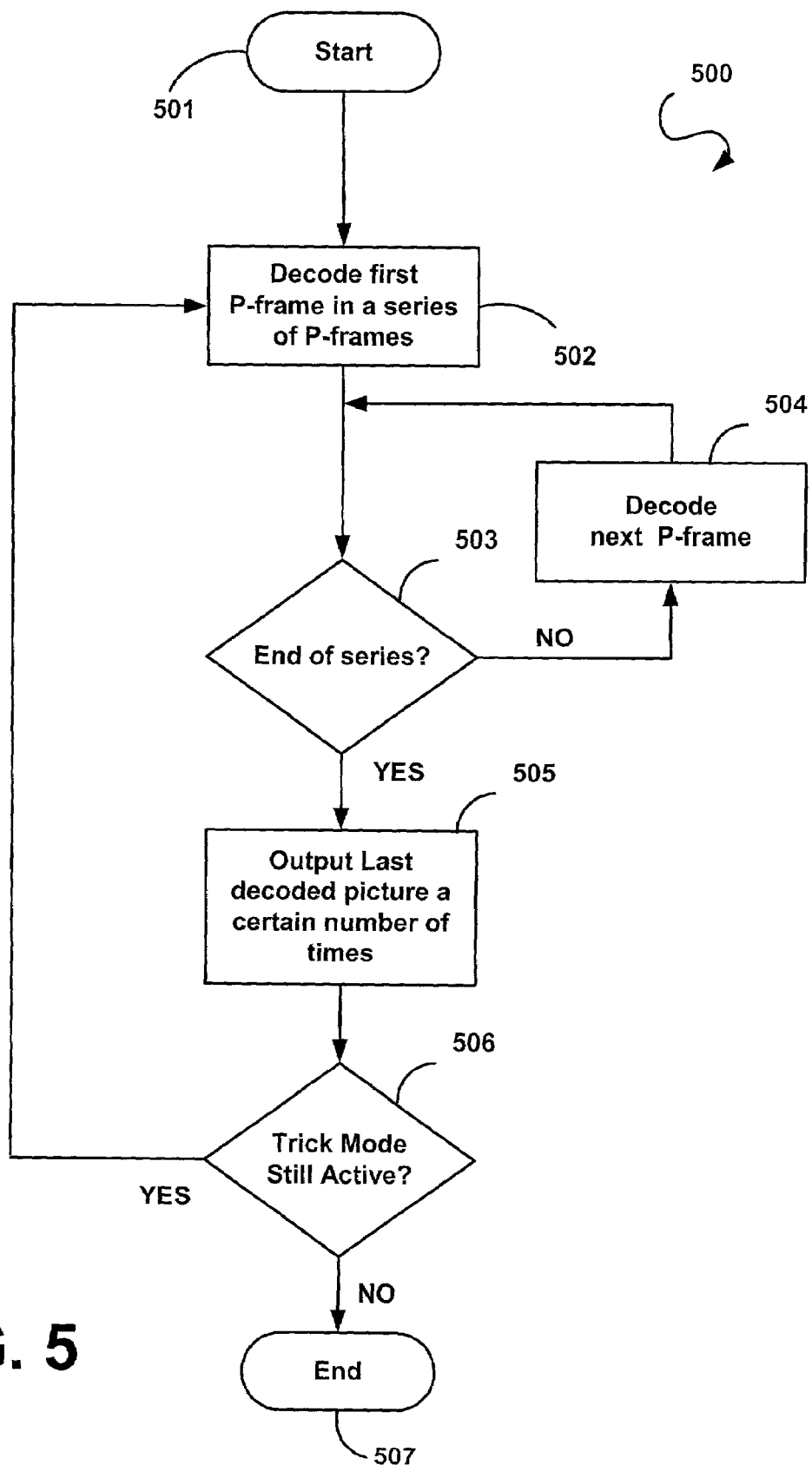
FIG. 5 is a flow chart depicting a non-limiting example of a method for providing trick mode functionality that is implemented by the DHCT depicted in FIG. 2.

FIG. 5 depicts a non-limiting example of a decoding method 500 for providing trick mode functionality in accordance with one embodiment of the present invention. The method 500 is initiated in step 501 after the media engine 222 receives a series of P-frames to be decoded and a message from the processor 244 instructing the media engine 222 to provide a trick mode operation. After the method 500 is initiated, the media engine 222 decodes in step 502 a first P-frame in the series of P-frames and determines in step 503 if the last P-frame in the series of P-frames has been decoded. If the last P-frame has not been decoded, the media engine 222 decodes the next P-frame in the series of P-frames, as indicated in step 504, and then returns to step 503 to determine if the last P-frame has been decoded. If the media engine determines in step 503 that the last P-frame in the series of P-frames has been decoded then the media engine outputs the last decoded P-frame a certain number of times, as indicated in step 505. The media engine 222 then determines in step 506 if the trick mode operation is still active. If the trick mode operation is still active then the media engine returns to step 502 and decodes a first P-frame in another series of P-frames that is received from hard disk 201. If the trick mode operation is no longer active, then the method 500 terminates as indicated in step 507. Therefore, although each P-frame is incapable of independently generating a complete picture, by decoding consecutive P-frames each using the previous P-frame as an anchor, a complete picture is eventually created and displayed.

As a non-limiting example of the decoding method 500, assume that an MPEG-2 stream includes the following frames: P1, B, B, P2, B, B, P3, B, B, P4, B, B, P5, B, B, P6, B, B, P7, B, B, P8, B, B, P9, B, B, P10, B, B, P11, B, B, P12, B, B, P13, B, B, P14, B, B, P15, B, B, P16, B, B, P17, B, B, P18, B, B, P19, B, B, P20, etc., where the numerals designate the relative display order of the P-frames in a normal play mode. Then, as a non-limiting example, if a fast play mode equal to three times (3×) the normal play speed is activated, and if the output rate is 30 pictures per second, then frames P1-P10 are decoded; frame P10 is output 10 times; frames P11-P20 are decoded; frame P20 is output 10 times; frames P21-P30 are decoded; frame P30 is output 10 times, and so on until the trick mode ends. For a fast reverse play speed of 3×that is activated after frame P140 is displayed during normal play mode, then as a non-limiting example, frames P121-P130 are decoded; frame P130 is output 10 times, frames P111-P120 are decoded; frame P120 is output 10 times; frames P101-P110 are decoded; frame P110 is output 10 times; and so on until the trick mode ends.

In an alternative embodiment, the series of frames that are decoded overlap so as to produce a smoother picture. For example, assuming a 3×fast play mode, and assuming an output rate of 30 pictures per second (pps), then frames P1-P10 are decoded; frame P10 is output 5 times; frames P6-P15 are decoded; frame P15 is output 5 times; frames P11-P20 are decoded; frame P20 is output 5 times; frames P16-P25 are decoded; frame P25 is output 5 times, and so on until the trick mode ends. For a fast reverse play speed of 3×that is activated after frame P135 is displayed during normal play mode, then as a non-limiting example, frames P121-P130 are decoded; frame P130 is output 5 times, frames P116-P125 are decoded; frame P125 is output 5 times; frames P111-P120 are decoded; frame P120 is output 5 times; and so on until the trick mode ends.

In yet another embodiment of the invention, the series of frames that are decoded are not contiguous. For example, assuming a 6×fast play mode, a 30 pps output rate, and a maximum decoding rate of 30 pps, then frames P11-P20 are decoded; frame P20 is output 10 times; frames P31-P40 are decoded; frame P40 is output 10 times; frames P51-P60 are decoded; frame P60 is output 10 times, and so on until the trick mode is cancelled. For a fast reverse play speed of 6×that is activated after frame P150 is displayed during normal play mode, then as a non-limiting example, frames P121-P130 are decoded; frame P130 is output 10 times; frames P101-P110 are decoded; frame P110 is output 10 times; frames P81-P90 are decoded; frame P90 is output 10 times and so on until the trick mode ends.

Figure 6:
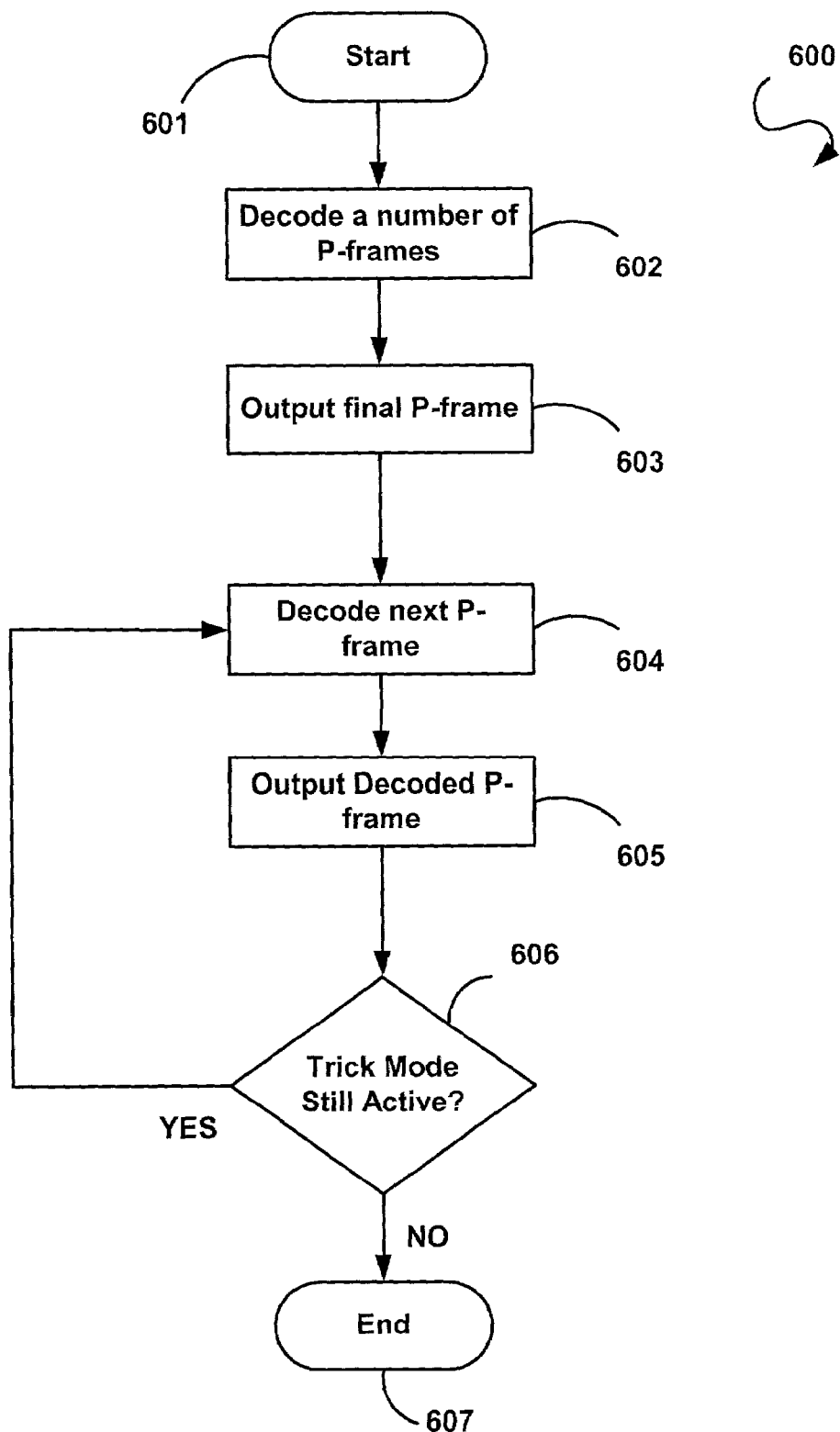
FIG. 6 is a flow chart depicting a non-limiting example of a method for providing trick mode functionality that is implemented by the DHCT depicted in FIG. 2.

FIG. 6 depicts a non-limiting example of a method 600 for providing fast play functionality in accordance with one embodiment of the present invention. The method 600 is initiated in step 601 after the media engine 222 receives video data to be decoded and a message from the processor 244 instructing the media engine 222 to provide a fast play operation. After the method 600 is initiated, the media engine 222 decodes in step 602 a certain number of P-frames and then outputs in step 603 the final P-frame among the certain number of P-frames. The certain number of P-frames is preferably equal to the number of P-frames that need to be decoded in order to produce a P-frame of a desirable quality. The media engine 222 then decodes the next P-frame in step 604 and displays the decoded P-frame in step 605. The media engine 222 then determines in step 606 if the trick mode operation is still active. If the trick mode operation is still active then the media engine returns to step 604 and decodes the next P-frame. If the trick mode operation is not longer active, then the method 600 terminates as indicated in step 607.

The blocks shown in FIGS. 3-6 represent modules, segments, or portions of code which include one or more executable instructions for implementing specific logical functions or steps in a process. The functionality provided by each of the methods illustrated in FIGS. 3-6, can also be implemented through hardware (e.g., an application specific integrated circuit (ASIC) and supporting circuitry). Each implementation may have a perceived advantage, however. For example, hardware enjoys a speed and, arguably, a reliability advantage over software because hardware testing and verification methods are currently more advanced than software verification methods. On the other hand, software can be less expensive than customized hardware and offers greater flexibility in adding or modifying product features.

The functionality provided by each of the methods illustrated in FIGS. 3-6, can be embodied in any computer-readable medium for use by or in connection with a computer-related system or method. In this context of this document, a computer-readable medium is an electronic, magnetic, optical, semiconductor, or other physical device or means that can contain or store a computer program or data for use by or in connection with a computer-related system or method. Also, the computer program or data may be transferred to another computer-readable medium by any suitable process such as by scanning the computer-readable medium. Thus, the computer-readable medium could be paper or other suitable medium upon which the computer program can be printed, scanned with an optical scanner, and transferred into the computer's memory or storage.

It should be emphasized that the above-described embodiments of the present invention, particularly any "preferred embodiments", are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and present invention and protected by the following claims.

What is claimed is:

1. A method for providing trick mode functionality, comprising the steps of:
   (a) storing a video stream containing dependent frames in memory;
   (b) storing information related to the video stream in memory;
   (c) receiving a request for a trick mode operation;
   (d) responsive to receiving the request for a trick mode operation, decoding a plurality of undecoded dependent frames in the video stream to create a single decoded frame; and
   (e) outputting the single decoded frame.

2. The method of claim 1, further comprising repeating steps (d) and (e) until the trick mode operation is cancelled.

3. The method of claim 1, further comprising determining whether the video stream includes independent frames.

4. The method of claim 1, wherein the video stream does not include independent frames.

5. The method of claim 4, wherein an independent frame is an I-frame.

6. The method of claim 1, wherein the undecoded dependent frames are P-frames.

7. The method of claim 1, wherein the related information comprises an index table.

8. The method of claim 7, wherein the index table identifies storage locations of respective sequence headers.

9. The method of claim 7, wherein the index table identifies storage locations of respective frame start codes.

10. The method of claim 7, wherein the index table identifies frame types.

11. The method of claim 7, wherein the index table identifies times of when respective frames were stored.

12. The method of claim 1, wherein the related information identifies whether the video stream contains I-frames.

13. The method of claim 1, wherein the related information comprises Packet identification codes (PIDs).

14. The method of claim 1, wherein the plurality of sequential undecoded dependent frames are determined based at least in part on a type of the video stream.

15. The method of claim 1, wherein the single decoded frame is output a plurality of times.

16. The method of claim 15, wherein the plurality of times that the single decoded frame is output is determined based at least in part on an output picture rate.

17. The method of claim 15, wherein the plurality of times that the single decoded frame is output is determined based at least in part on a speed of the trick mode operation.

18. The method of claim 15, wherein the plurality of times that the single decoded frame is output is determined based at least in part on a ratio of P-frames to B-frames in the video stream.

19. The method of claim 15, wherein the plurality of times that the single decoded frame is output is determined based at least in part on the plurality of sequential undecoded dependent frames.

20. The method of claim 1, wherein the trick mode operation is a fast play mode.

21. The method of claim 1, wherein the trick mode operation is a rewind mode.

22. The method of claim 1, wherein a first tuner receives an analog video signal corresponding to a first video stream and a second tuner simultaneously receives a digital compressed stream corresponding to a second video stream; wherein the first video stream and the second video stream are annotated to facilitate future retrieval from memory; wherein the first video stream and the second video stream are stored in memory; and wherein at least one of the first video stream and the second video stream is output to a display device.

23. The method of claim 1, wherein an entry point for a trick mode operation is specified based on an elapsed normal playback time and/or a number of frames relative to a beginning of the video stream.

24. The method of claim 1, wherein in response to the request, a processor reads information in an index table, retrieves annotation data that correspond to the video stream, and determines an entry point for fulfilling the trick mode request.

25. A system for providing trick mode functionality, comprising:
   memory for storing a video stream and information related to the video stream;
   determination logic configured to determine whether a request for a trick mode operation has been received in connection with the video stream; and
   decoding logic configured to decode a plurality of undecoded dependent frames corresponding to the video stream to produce a single decoded frame, responsive to the determination logic determining that the request for the trick mode operation has been received; and
   output logic configured to output the single decoded frame.

26. The system of claim 25, wherein the related information comprises an index table.

27. The system of claim 26, wherein the index table identifies storage locations of respective sequence headers.

28. The system of claim 26, wherein the index table identifies storage locations of respective frame start codes.

29. The system of claim 26, wherein the index table identifies frame types.

30. The system of claim 26, wherein the index table identifies times of when respective frames were stored.

31. The system of claim 25, wherein the related information identifies whether the video stream contains I-frames.

32. The system of claim 25, wherein the related information comprises Packet identification codes (PIDs).

33. The system of claim 25, wherein the plurality of undecoded dependent frames are determined based at least in part on a type of the video stream.

34. The system of claim 25, wherein a number of times that the single decoded frame is output is determined based at least in part on an output picture rate.

35. The system of claim 25, wherein a number of times that the single decoded frame is output is determined based at least in part on a speed of the trick mode operation.

36. The system of claim 25, wherein a number of times that the single decoded frame is output is determined based at least in part on a ratio of P-frames to B-frames in the video stream.

37. The system of claim 25, wherein a number of times that the single decoded frame is output is determined based at least in part on the plurality of undecoded dependent frames.

38. The system of claim 25, wherein the trick mode operation is a fast play mode.

39. The system of claim 25, wherein the trick mode operation is a rewind mode.

40. The system of claim 25, wherein a first tuner receives an analog video signal corresponding to a first video stream and a second tuner simultaneously receives a digital compressed stream corresponding to a second video stream; wherein the first video stream and the second video stream are annotated to facilitate future retrieval from memory; wherein the first video stream and the second video stream are stored in memory; and wherein at least one of the first video stream and the second video stream is output to a display device.

41. The system of claim 25, wherein an entry point for a trick mode operation is specified based on an elapsed normal playback time and/or a number of frames relative to a beginning of the video stream.

42. The system of claim 25, wherein in response to the request, a processor reads information in an index table, retrieves annotation data that correspond to the video stream, and determines an entry point for fulfilling the trick mode request.

43. A method for providing trick mode functionality, comprising the steps of:
   storing in memory a video stream;
   storing information related to the video stream in memory;
   receiving a request for a trick mode operation;
   determining whether the video stream contains independent frames;
   responsive to receiving the request for a trick mode operation, decoding a plurality of undecoded dependent frames corresponding to the video stream to create a single decoded frame if the video stream does not contain independent frames; and
   outputting the single decoded frame a plurality of times.

44. The method of claim 43, further comprising the steps of:
   decoding a first frame in the plurality of undecoded dependent frames;
   decoding another frame in the plurality of undecoded dependent frames using the decoded first frame as an anchor; and
   outputting the another frame a plurality of times.

45. The method of claim 44, further comprising the steps of:
   decoding a first frame in the plurality of undecoded dependent frames; and
   decoding each remaining frame in the plurality of undecoded dependent frames using the previously decoded frame as an anchor; and
   outputting one of the remaining frames a plurality of times.

46. The method of claim 44, wherein the plurality of undecoded dependent frames comprises a series of undecoded dependent frames, and further comprising the steps of:
   decoding the first frame in the series of undecoded dependent frames;
   decoding each remaining frame in the series of undecoded dependent frames using one of the previously decoded frames as an anchor; and
   outputting one of the remaining frames a plurality of times.

47. The method of claim 44, wherein the plurality of undecoded dependent frames comprises a series of undecoded dependent frames, and further comprising the steps of:
   decoding a first frame in the series of undecoded dependent frames;
   decoding each remaining frame in the series of undecoded dependent frames using one of the previously decoded frames as an anchor; and
   outputting the last frame of the remaining frames a plurality of times.

* * * * *